United States Patent
Wong et al.

(10) Patent No.: US 11,226,865 B2
(45) Date of Patent: Jan. 18, 2022

(54) MOSTLY UNIQUE FILE SELECTION METHOD FOR DEDUPLICATION BACKUP SYSTEMS

(71) Applicant: EMC IP Holding Company LLC, Hopkinton, MA (US)

(72) Inventors: Tony Wong, Milpitas, CA (US); Hemanth Satyanarayana, Santa Clara, CA (US); Abhinav Duggal, Jersey City, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 421 days.

(21) Appl. No.: 16/252,308

(22) Filed: Jan. 18, 2019

(65) Prior Publication Data

US 2020/0233752 A1 Jul. 23, 2020

(51) Int. Cl.
*G06F 16/17* (2019.01)
*G06F 11/14* (2006.01)
*G06F 16/174* (2019.01)

(52) U.S. Cl.
CPC ...... *G06F 11/1453* (2013.01); *G06F 16/1748* (2019.01); *G06F 2201/84* (2013.01)

(58) Field of Classification Search
CPC ............ G06F 11/1453; G06F 16/1748; G06F 2201/84
USPC ........................................................ 707/654
See application file for complete search history.

(56) References Cited

U.S. PATENT DOCUMENTS

| | | | |
|---|---|---|---|
| 8,825,720 B1* | 9/2014 | Xie | G06F 16/1727 707/813 |
| 9,189,414 B1* | 11/2015 | Shim | G06F 12/08 |
| 9,336,143 B1* | 5/2016 | Wallace | G06F 3/0641 |
| 9,361,321 B1* | 6/2016 | Auchmoody | G06F 11/1453 |
| 9,390,116 B1* | 7/2016 | Li | G06F 16/2272 |
| 9,405,761 B1* | 8/2016 | Botelho | G06F 16/13 |
| 9,594,674 B1* | 3/2017 | Mondal | G06F 16/1748 |
| 9,594,753 B1* | 3/2017 | Pang | G06F 16/113 |
| 9,715,505 B1* | 7/2017 | Mondal | G06F 16/162 |
| 9,996,426 B1* | 6/2018 | Pogde | G06F 16/184 |
| 10,055,420 B1* | 8/2018 | Pogde | G06F 11/1448 |
| 2014/0114933 A1* | 4/2014 | Chandrasekarasastry | G06F 3/06 707/692 |
| 2016/0048408 A1* | 2/2016 | Madhu | G06F 11/2023 718/1 |
| 2017/0032013 A1* | 2/2017 | Zheng | G06F 16/285 |

* cited by examiner

*Primary Examiner* — Hosain T Alam
*Assistant Examiner* — Robert F May
(74) *Attorney, Agent, or Firm* — Staniford Tomita LLP

(57) ABSTRACT

Embodiments for a mostly unique file selection process for a deduplication backup system are described. The process assigns tags to files. A tag serves as a hint about the similarity of files in a deduplication file system. It is expected that files from the same client machine will be assigned the same tag. The tag is the smallest unit of migration and serves as a hint of the similarity of the files. The MUFS process measures the uniqueness using a u-index that is a function of the total unique size of a tag relative to the total size of the tag. A load balancer then selects the most unique tags for migration to free the maximum space. It uses the u-index to measure the uniqueness percentage of a tag, so that tags with the highest u-index are selected for migration to free up maximum space on the source node.

13 Claims, 11 Drawing Sheets

Example 1: very low maximum tag limit = 5

LO dictionary

902

| FP1 | 5 Tags | 3 evicted |
| --- | --- | --- |
| FP2 | 3 | |
| FP3 | 5 | 2 |
| FP4 | 5 | 4 |
| FP5 | 2 | |

9 tags are evicted unnecessarily.

FIG. 9

Example2: very high limit = 30

LO dictionary

1002

| FP1 | 17 Tags |
| --- | --- |
| FP2 | 15 |
| FP3 | 18 |
| FP4 | 3 |
| FP5 | 1 |

Memory can be exhausted after the third FP. No more memory for FP4 and Fp5 and anything after that.

1302

MOSTLY UNIQUE FILE SELECTION METHOD FOR DEDUPLICATION BACKUP SYSTEMS

CROSS-REFERENCE TO RELATED APPLICATIONS

The present application is related to U.S. patent application Ser. No. 16/263,281, filed on Jan. 31, 2019, and entitled "Slab Memory Allocator with Dynamic Buffer Resizing" now U.S. Pat. No. 10,853,140, and which is assigned to the assignee of the present application. The related application is incorporated by reference in its entirety.

TECHNICAL FIELD

Embodiments directed to deduplication backup systems, and specifically to methods for selecting mostly unique files to move among nodes in a clustered environment.

BACKGROUND OF THE INVENTION

In data backup and high available network systems, a cluster is a collection of multiple nodes that communicate with each other to perform set of operation at high available rates. At present, there are typically four nodes in a cluster, but any number from two to eight or sixteen nodes is possible. Each node is single entity machine or server. Clusters can be relatively easily scaled-up by adding additional nodes. As a cluster grows, the distribution of the data can become uneven because of the addition or deletion of cluster nodes, or an unbalanced ingest rate from the clients. In this case, files should be moved between nodes to balance the load. It is also possible that data should be redistributed due to performance bottlenecks. In all these cases, a load balancer module of the cluster needs to select a subset of files from the congested node to migrate to another node. In a cluster-based storage system where each cluster contains a number of nodes and heavy data loads, proper operation involves frequent, if not constant movement of files among the nodes to maintain efficiency.

In a deduplication backup system, such as the EMC DDFS (Data Domain File System) scaled out architecture, the file system's namespace spans multiple storage nodes to create a global namespace in which a user can see files from any node and it appears as only one file space. In a regular file system, moving files between nodes easily frees up space in the original node. In DDFS or similar file systems, however, deduplication occurs only within each single node. When files are moved between nodes, the logical (versus physical) space is not necessarily saved and it is easy to lose the advantage of deduplication. This issue has made it very difficult to implementing effective deduplication backup solutions in cluster-based networks.

What is needed, therefore, is a cluster-based file architecture that can efficiently move files out of node and free the corresponding amount of space on a node to enable the use of deduplication processes on the files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 9 shows an example of tag eviction when a low maximum tag limit is set in an example embodiment.

FIG. 10 shows an example of memory exhaustion when a high tag limit is set in an example embodiment.

DETAILED DESCRIPTION

Figure 1:
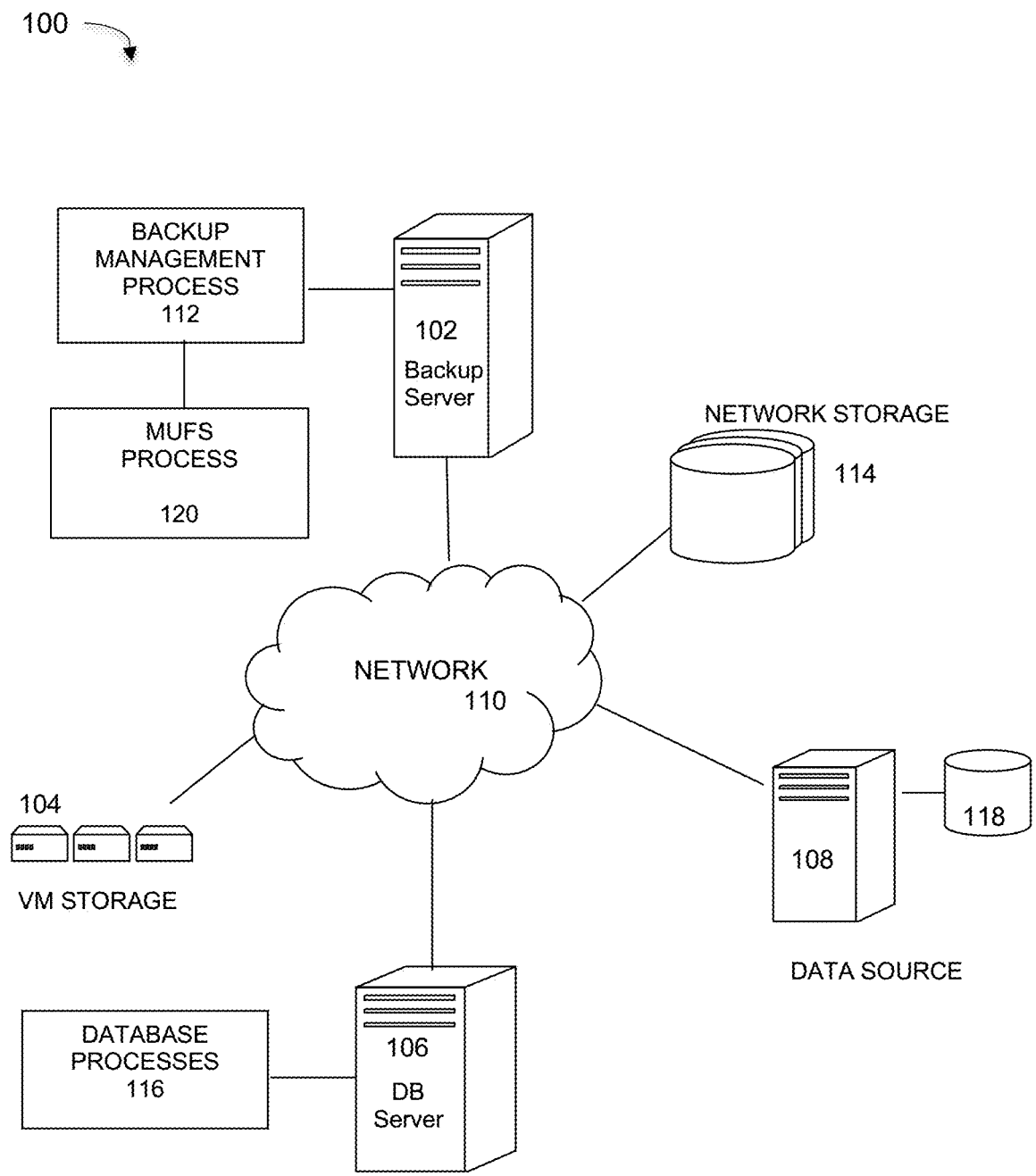
FIG. 1 illustrates a computer network system that implements one or more embodiments of a large-scale network implementing a mostly unique file selection (MUFS) process for deduplication backup systems.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and backup in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a method and system that facilitates the implementation of deduplication file systems in clustered systems by, in part, keeping similar files in the same node so as to optimize space savings and ensure that deduplication is effective. Such as process is referred to as a Mostly Unique File Selection Process (MUFS) and is configured to move similar files (i.e., those in which the data is largely the same or sufficiently related such as through sequential backups or data from the same client) rather than randomly selected files. This process also ensure that the space freed up after migration from one node to another is optimal with respect to equality between the number of files moved and the space that is freed up. For example, if 1 GB of data is moved out of a node, 1 GB or close to 1 GB of space should be freed up (as opposed to on the order of only 10 MB freed up, which is not efficient).

FIG. 1 illustrates a computer network system that implements one or more embodiments of a large-scale network implementing a mostly unique file selection (MUFS) process for deduplication backup systems. In system 100, a backup server 102 executes a backup management process 112 that coordinates or manages the backup of data from one or more data sources 108 to storage devices, such as network storage 114, client storage 106, and/or virtual storage devices 104. With regard to virtual storage 104, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a Data Domain Restorer (DDR)-based deduplication storage system, and storage or backup server 102 may be implemented as a DDR Deduplication Storage server provided by EMC Corporation that provides a platform for data backup, archiving, and disaster recover. However, other similar backup and storage systems are also possible.

MUFS for DDFS

As shown in FIG. 1, system 100 includes MUFS process 120 associated with or executed as part of the backup management process 112. As stated above, the MUFS is configured to operate such that related files, i.e., those that have a high degree of repeated data, are selected for migration, and the space freed after the migration should is as close as possible to the amount of space moved during the migration. In an embodiment, the similarity of files is measured by determining and using a uniqueness index "u-index" for each file. Embodiments use a tag that is associated with the file. A tag is a 64-bit number that is assigned to a group of related files by the application software. It can be assumed that the tag is unique for different groups of files, and any appropriate size tag can be used.

Embodiments of the MUFS process 120 provide marked advantages over existing or previous solutions. For example, in a previous solution, to compute the u-index, the unique size and the total size of a tag (or file) must be computed. In DDFS, there is a PCR (physical capacity reporting) that can estimate the physical size of a group of files (after deduplication). It can be modified to compute the unique size of each tag as well. Suppose there are n tags T1, T2, T3 . . . Tn, PCR can be adapted to compute the unique size of each tag as follows:

1. Create a Bloom filter representation for each tag. This bloom filter is sized for all the possible sampled fingerprints in the file system and it is 20 MB in size.
2. The total physical size of each tag can be computed using the Bloom filter.
3. To compute the unique physical size of each tag, e.g. Tk, create the union of the Bloom filters from all the other tags (except Tk), call that Tk*, the unique size of:

$$Tk=|Tk|-|Tk\ Tk^*|=|Tk|-(|Tk|+|Tk^*|-Tk\ Tk^*|)=|Tk\ Tk^*|-|Tk^*|=\text{Total physical size of all files}-|Tk^*|$$

The time complexity for this operation above is $O(n^2)$. Once the total unique size and the total size of tag is known, the u-index (=percentage of unique space) is simply the ratio of the two sizes. However, if there are 100,000 tags, the amount of memory required is 20 MB*100000=2 TB and the time complexity is $O(100,000^2)$. The Bloom filters must be persisted on disk and disk I/O is required for each operation.

As compared to the above-described present method, the MUFSA process requires much less memory and all the data structures can fit into the memory of all the Data Domain storage platforms. The algorithm has a time complexity of O(N) where N is the number of sampled fingerprints. Because of the memory requirement and the time complexity, the PCR mechanism cannot be applied to implement DDFS in clustered systems.

Embodiments of the MUFS process 120 include several components or processing features to achieve this advantageous effect. These include: (1) the use of a tag as a hint to group similar files; (2) the use of u-index to measure the uniqueness percentage of a tag or file; (3) the construction of a LP and L0 dictionary that support very efficient computation of the u-index, total unique size, and physical size of a tag: (4) a dynamic memory allocator to support the LP and L0 dictionary; (5) an estimate of the total unique size and the total size of the tags; (6) a unique method to compute the u-index; and (7) the selection of a group of tags for migration to free up a specific amount of storage space.

Figure 2:
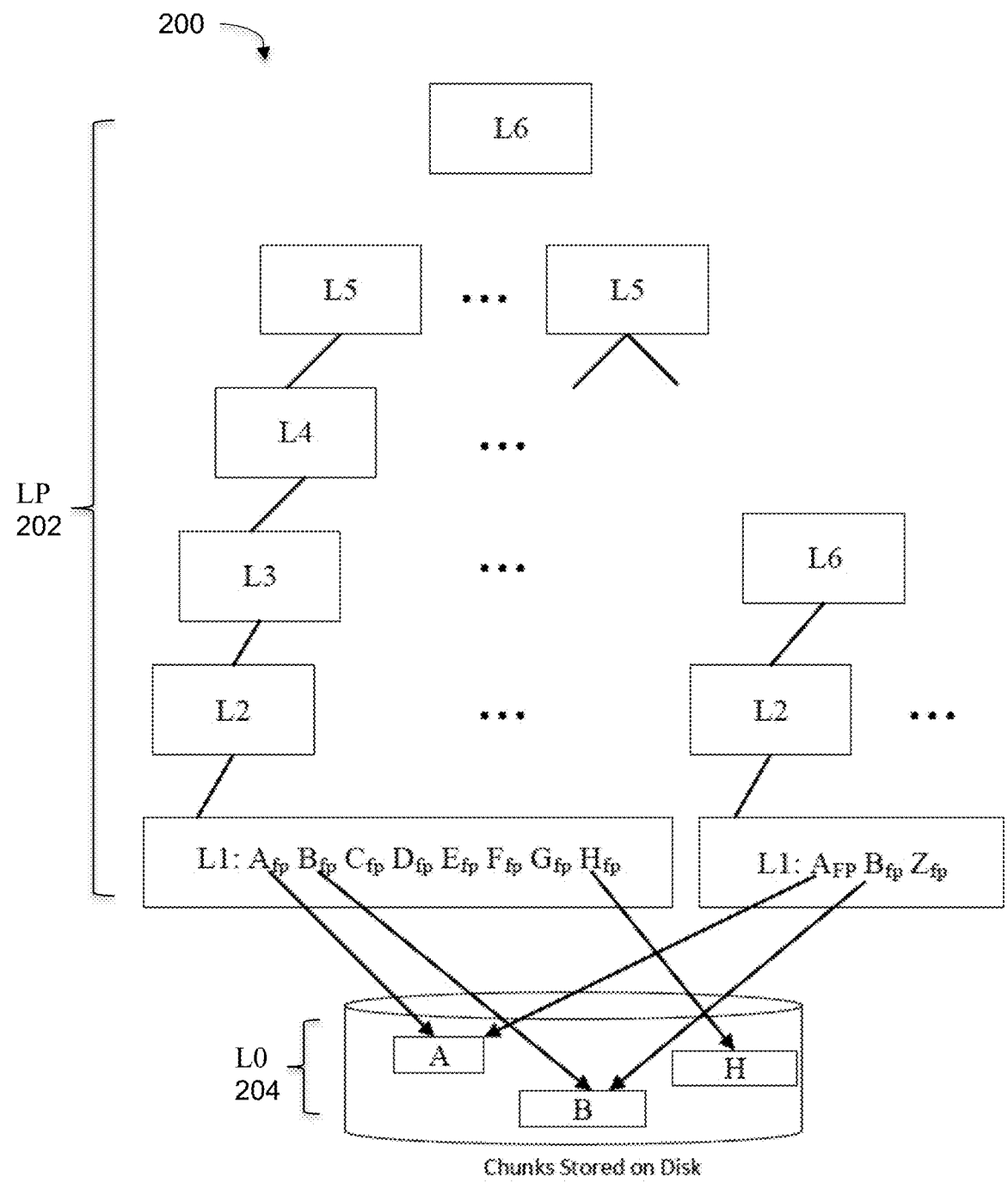
FIG. 2 shows a typical file tree representation in deduplicated storage for use in an MUFS process, under some embodiments.

FIG. 2 shows a typical file tree representation in deduplicated storage for use in an MUFS process, under some embodiments. The chunks directly written by users are represented as L0, 204, meaning the lowest level of the tree. Consecutive L0 chunks are referenced with an array of fingerprints by an L1 chunk, and an array of L1 fingerprints are referenced by an L2 chunk. This continues up to the top of the tree that is labeled L6 for consistency, even if the file is small enough not to need intermediate nodes such as the example on the right side of the figure. The L1-L6 chunks are referred to as LP chunks 202, where P is a parameter that ranges from 1 to 6 and indicates metadata representing the file. Representing a file in a tree structure of fingerprints covering the lower layers of the tree is often called a Merkle tree. Deduplication takes place because a chunk can be referenced multiple times such as chunks A and B in the example. Though not shown in FIG. 2, LP chunks are themselves stored on disk in containers.

As an example, consider a system with 100 TB of capacity, 10 times deduplication ratio (logical capacity divided by physical capacity), 8 KB L0 chunks, and 20-byte fingerprints. The logical capacity is 1 PB, and since each 8 KB logically written by a client requires a 20-byte fingerprint stored in an L1, the L1 chunks are 2.5 TB, though the upper levels of the tree are smaller. This example highlights that the mark phase cannot be fully performed in memory, as the L1 references should be read from disk. In an embodiment, the system 100 container format includes a metadata section with a list of fingerprints for the chunks within the container. The metadata region is relatively small (a few hundred KB) and can be read more quickly than the full container With reference to FIG. 2, the L0 segments 204 represent user data (e.g., data chunks stored on disk) and are the leaves of the tree. The L6 is the root of the segment tree. Segments from L1 to L6 are referred to as metadata segments or LP segments, 202. They represent the metadata of a file associated with a file tree. An L1 segment is an array of L0 references. Similarly, an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory.

Figure 3:
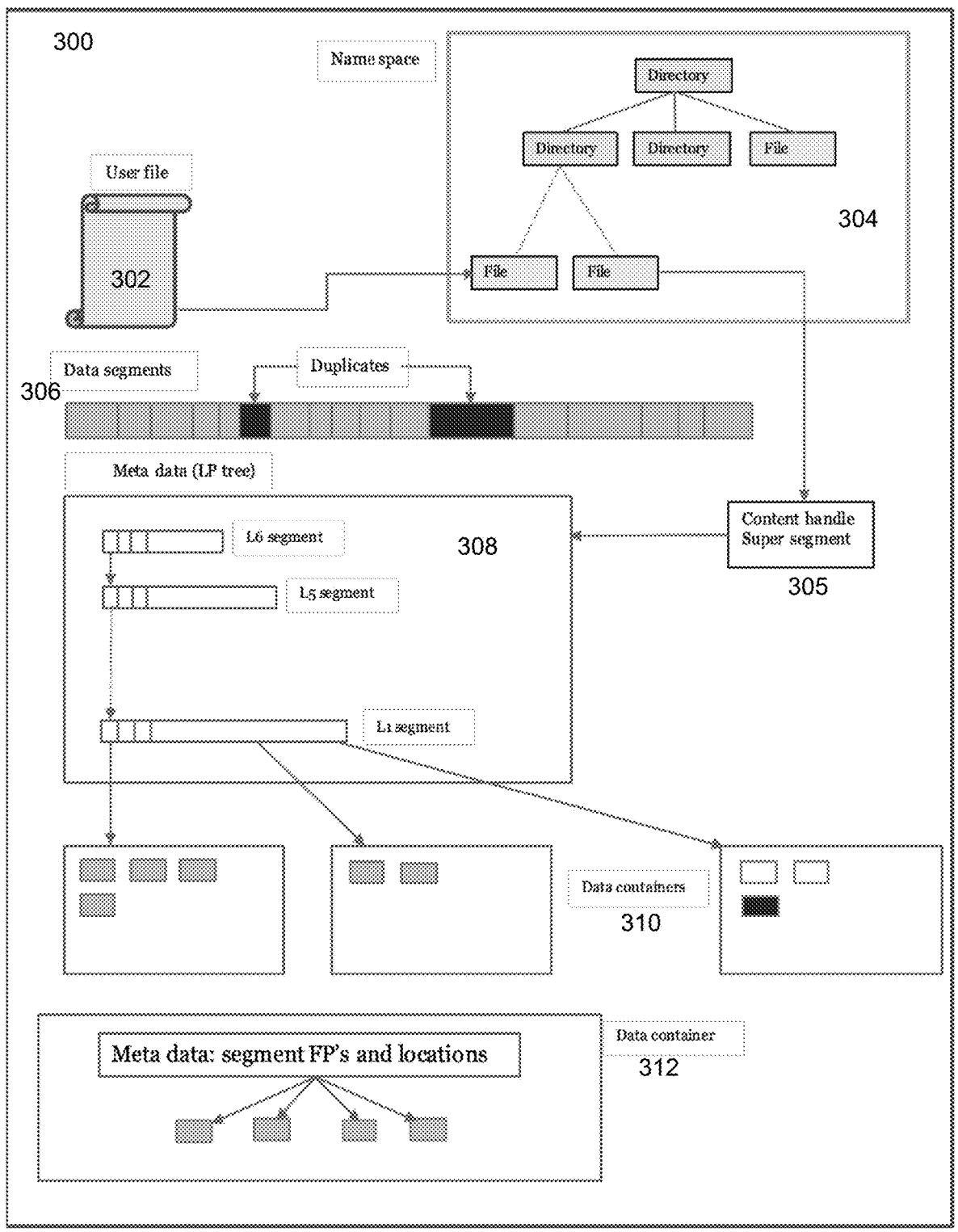
FIG. 3 illustrates a DDFS-based system that implements an MUFS process, under some embodiments.

FIG. 3 illustrates a DDFS-based system 300 that implements an MUFS process, under some embodiments. In a Data Domain file system (DDFS), or any similar deduplication system architecture, as data enters DDFS, it is segmented and filtered against existing segments to remove duplicates. Any unique data segments are then stored in fixed size immutable containers. As shown in FIG. 3, the content handle of a user file 302 is kept in the file system's namespace to support the directory hierarchy 304. The content handle points to super segment 305 which holds the reference to the top of the segment tree 308 of the file. A super segment points to top reference that points to metadata and data segments 306, which shows some example duplicates segments. Metadata segments are LPs (from L6 to L1) and data segments are L0's. The segments are packed into immutable containers 310 of about 4.5 MB in size. As shown for example data container 312, there is a metadata section in the header of the container that describes the fingerprints and their location in the container. In an embodiment, segments (L6, L5 . . . L0) are identified by a 24-byte fingerprint, such as comprising a 20-byte SHA1 hash value and a 4-byte XOR value.

Thus, the general relationship of content handler to fingerprints for use in the MUFS process is provided in the following schematic:
CONTENT HANDLER→SUPERSEGMENT→METADATA (LP)→DATA (L0)→FP The file system maintains an index table of segment fingerprints to container mapping. It allows fast lookup if a segment exists and it is known where it is located. If a data segment X is shared between file A and file B, DDFS will only create 1 L0 segment and it will be referenced by a L1 segment in file A and another L1 segment in file B. This is the essence of data deduplication.

Embodiments use a tag that is assigned to a file. All fingerprints of a file will be mapped to the same tag. However, multiple files can share the same data segments, so one FP can be mapped to multiple tags. In the DDFS scaled-out architecture, application software can assign a 64-bit tag ID to the files. Other tag sizes may also be provided depending on the file system or file system version. It is expected that files from the same client will be assigned the same tag. The tag serves as a hint of the similarity or relatedness of the data within the files. That is, files from the same client generally have more identical data than files from different clients. Similarly, files updated through sequential or generational backup sessions usually have a large amount of identical (repeated) data. use a tag that is associated with the file.

The DDFS also supports a virtual synthetic (VS) mechanism in which applications can include portions of another file in its content. This will result in sharing of LP segments. For traditional data ingest processes, there is no sharing at the LP level. Only the L0 segments can be shared. LP sharing, however, is possible but highly unlikely across file tags because applications should have no knowledge of the data outside a client. Thus, LP sharing is not a practical consideration in the MUFS process.

In an embodiment, the MUFS process works on file tags rather than the files itself. The MUFS process can operate on files, but DDFS supports up to one billion files, and the memory requirement will greatly exceed what is available. Thus, MUFS is configured instead to operate on the tags. Essentially, files from the same tag group are considered as one big set or union, and will always be moved together as one unit. Thus, instead of 1 billion files, the number of tag groups DDFS can support is around 100,000.

Although files with different tags come from different clients, there can be deduplication between tags. For example, if two tags contain the same files, migrating one tag will result in extra space consumption on the target node and no space cleaned on the source node. The MUFS process can select tags with the highest percentage of unique data to maximize the amount of space freed.

Figure 4:
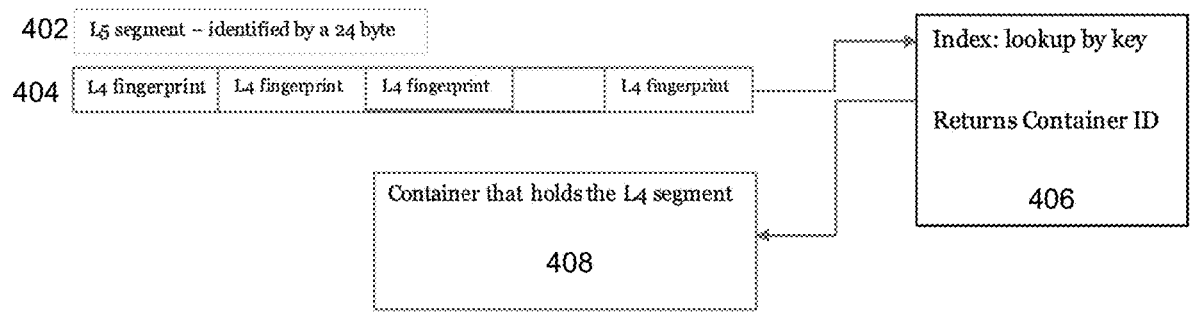
FIG. 4 illustrates an example of a given LP segment containing references for the keys of a lower segment, in an example embodiment of the MUFS process.

As shown in diagram 200 of FIG. 2, each LP segment contains references to lower level LP segments. FIG. 4 illustrates an example of an L5 segment 402 containing L4 (or below) references 404, which is the key of that L4 segment. The L5 segment is of defined size, identifier, such as a 24-byte ID. For this example, to locate the L4 segment, the L4 key is looked up in the DDFS index 406 to obtain the container ID for the container 408 that holds the content of the L4 segment.

In implementation, certain assumptions or defined systems settings are made to ensure proper operation of the MUFS process. A first assumption is that each file is assigned a tag. Files without a tag will be ignored. A second assumption is that there is no LP sharing across tags. LP sharing can occur, depending on the ingest protocol. However, they should be contained within the same client's backup, hence the same tag. L0 segments, on the other hand, can be shared across tags. A third assumption is that the LP segment tree follows a strict hierarchy, that is:

L6→L5→L4→L3→L2→L1→L0

In fact, DDFS sometimes skips some LP levels, e.g., L5→L1. In general, this does not affect the MUFS process. Therefore, the strict hierarchy is assumed without loss of generality. A fourth assumption is that the tag ID's are dense, i.e., TagID={k: 0<=k<=N} where N is not a very big integer (e.g., 100,000). The tag ID can be a large integer, e.g. 64-bit integer and the tags can be sparse. However, a simple mapping table can be created to map the tag ID to a consecutive range of small integers (e.g., 0 to 100,000) to reduce the memory consumption in the L0 dictionary. This assumption can also simplify the constructions of several auxiliary data structures into simple array.

U-Index

In an embodiment, the u-index is the percentage of unique space of the tag and is calculated by dividing the total unique space for the tag by the total physical space, expressed in the following equation:

$$u\text{-index}=(\text{total unique space})/(\text{total physical space})$$

The total unique space is a value between 0 and 1. If a tag is totally unique, the u-index will be 1. If two tags are identical, their u-index will be 0. Any value between 0 and 1 indicates a degree of similarity between the two tags. A tag that is identical to another tag will always have a u-index of 0. The total physical space is the total physical space occupied by the tag/file object. If a file is totally unique, its unique size is the same as the total physical size, so the u-index will be 1 in this case.

A key data structure in process 120 is a fingerprint to tag (FP_to_tag) dictionary. This is used in both an LP dictionary and an L0 dictionary. While it is technically possible to combine the LP and L0 segments into one common dictionary, it is advantageous to separate them as there are some minor differences between the LP dictionary and the L0 dictionary. For example, sampling is generally done only on the L0 segments. Also, based on the second assumption above (no LP sharing across file tags), there is at most one tag reference to a LP segment but there can be multiple references to a L0 segment; and finally, only the L0 dictionary is needed for the computation of the u-index, total size and total unique size.

Thus, the general relationship of files to tags for use in the MUFS process is provided in the following schematic FILE+TAG→DATA SEGMENTS→FINGERPRINTS→FP|TAG (key-value)

A file is broken down into its data segments. The segments are then identified by respective fingerprints (e.g., 24-byte SHA1+XOR). The fingerprint is then stored as a key mapped to a tag value, which is stored in a key-value database.

Figure 5:
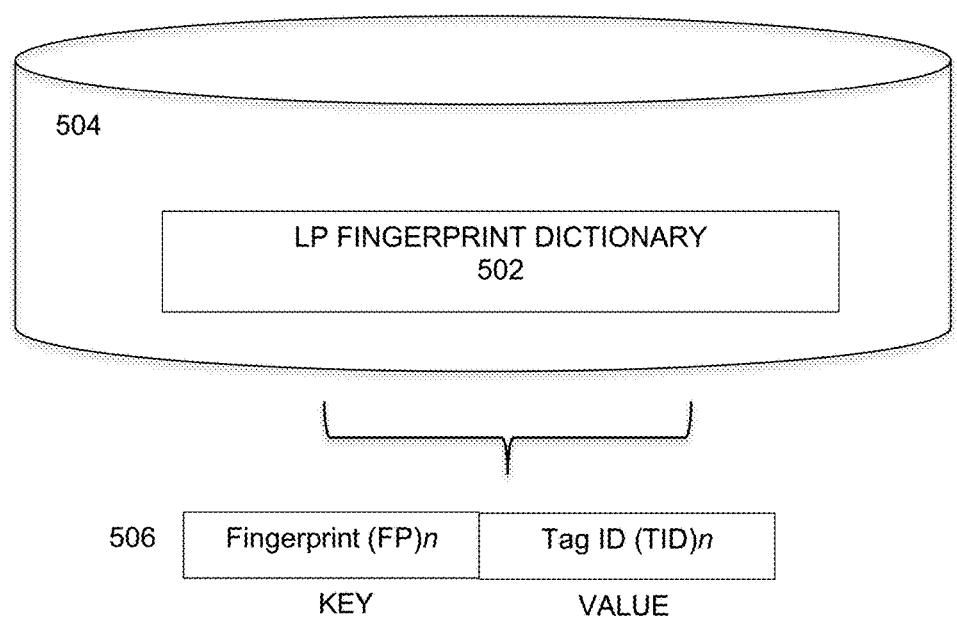
FIG. 5 illustrates an LP fingerprint dictionary used by the MUFS process, under some embodiments.

FIG. 5 illustrates a LP fingerprint dictionary used by the MUFS process, under some embodiments. As shown in FIG. 5, LP fingerprint dictionary 502 is stored in a data store 504 of the system or server computer. In an embodiment, the data store 504 may be maintained fully in memory. The LP dictionary 502 will map one fingerprint FP to one tag, as shown for example data structure 506. The fingerprint (FP) and Tag ID (TID) may be stored as a key-value pair with the mapping: FP→TID. Each entry in the dictionary corresponds to a reference to the fingerprint (FP) by the tag <TID>.

Any number (n) of key-value maps 504 may be stored in the dictionary 502, and storage 504 may be implemented as a key-value store. In general, the number of LP segments in a file system is substantially less than the L0 segments. It is sufficient to use a hash table to implement this dictionary data structure 502. More memory efficient dictionary structures are available but any generic dictionary data structure can be used under different embodiments.

Figure 6:
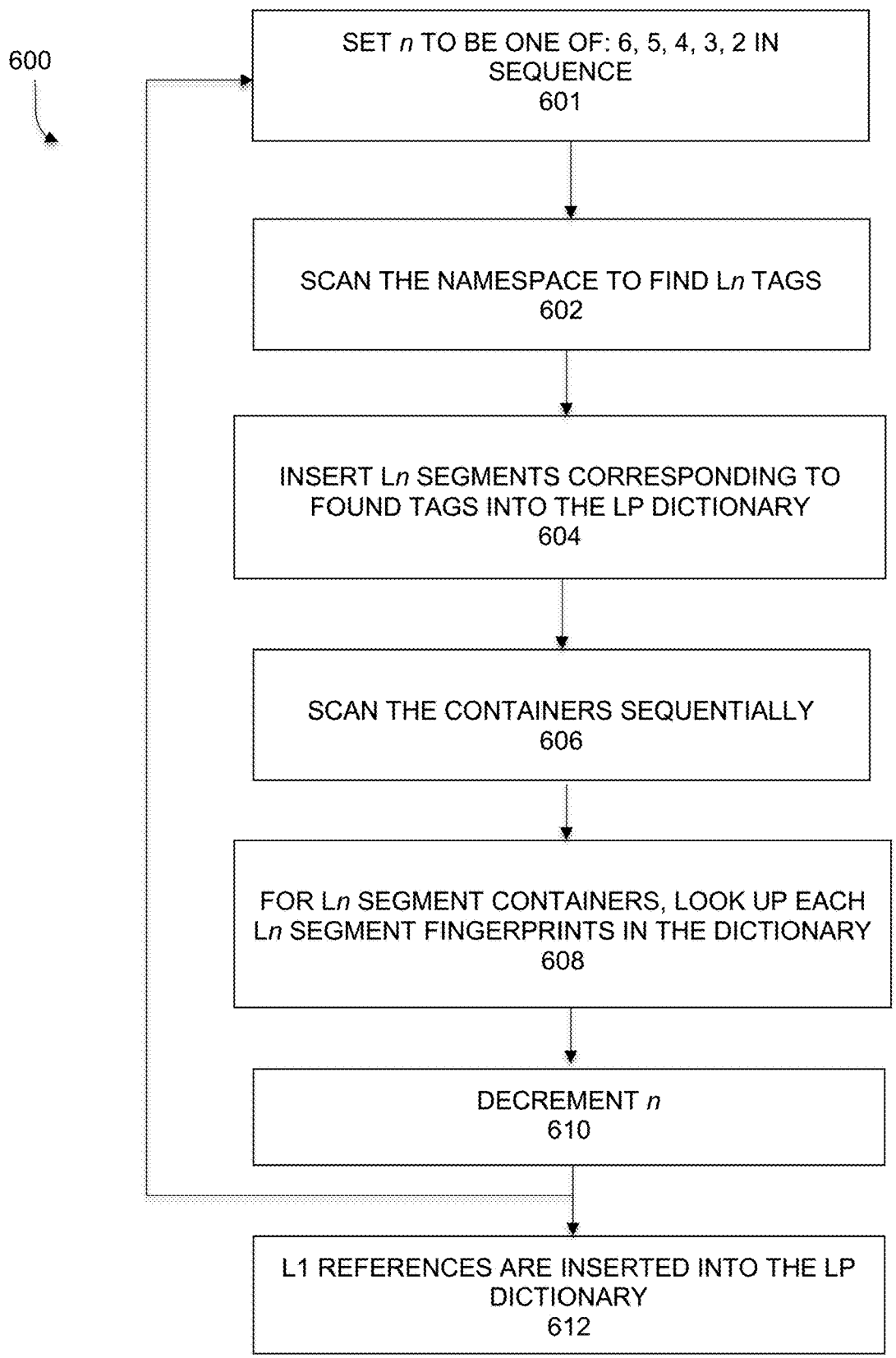
FIG. 6 is a flowchart that illustrates a method of constructing an LP dictionary, under some embodiments.

FIG. 6 is a flowchart that illustrates a method of constructing an LP dictionary, under some embodiments. As shown in FIG. 6, to construct this dictionary, the process iterates over LP levels over n=6, 5, 4, 3, 2, and then for L1, 601. the namespace is scanned to find all the tags for a particular L level, Ln where n goes from L6 down to L2, 602. For the purpose of the following description, process 600 is described with n=6. In this case, all the L6 segments corresponding to the tags found in the namespace are then inserted into the dictionary, 604. For example, the following found segments may be inserted: (FP1, TID1), (FP2, TID2), (FP3, TID3), and so on.

Figure 7:
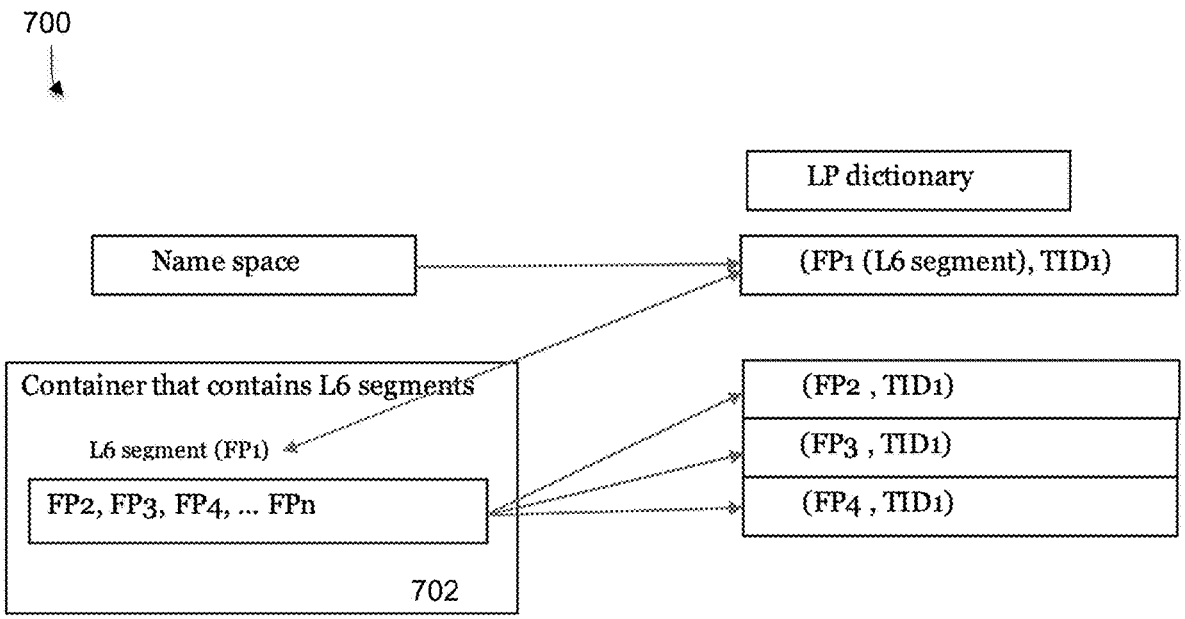
FIG. 7 illustrates segment fingerprints contained in an L6 segment inserted into a fingerprint-tag dictionary in an example embodiment.

Next the containers are scanned sequentially, 606. With respect to nomenclature, for each sequential scan, the segments can be denoted with prime ('), double-prime ("), and so on, to distinguish themselves. For containers that contain L6 segments, each of the L6 segment fingerprints is looked up in the dictionary, 608. For example, if the L6 segment is FP1 and an entry (FP1, TID1) is found in the dictionary, all the segment FP's contained in the L6 segment are inserted into the dictionary; thus, if the L6 segment contains segments FP2, FP3, FPn, the records (FP2, TID1), (FP3, TID1), to (FPn, TID1) will be inserted into the dictionary. This is illustrated in the example diagram of FIG. 7. As shown in diagram 700 of FIG. 7, the example shows that entry (FP1, TID1) is in a container 702 that contains L6 segments, and the records (FP2, TID1), (FP3, TID1), and (FP4, TID1) are inserted into the dictionary.

With reference back to FIG. 6, the process 600 is repeated for L5 segments, L4 segments, L3 segments, and L2 segments. Thus, the after L6, the process decrements n to be 5 and the process repeats for L5, then L4, L3, and L2. At the end of these process iterations, all the L1 references and their corresponding file ID will have been inserted into the LP dictionary, 612.

Figure 8:
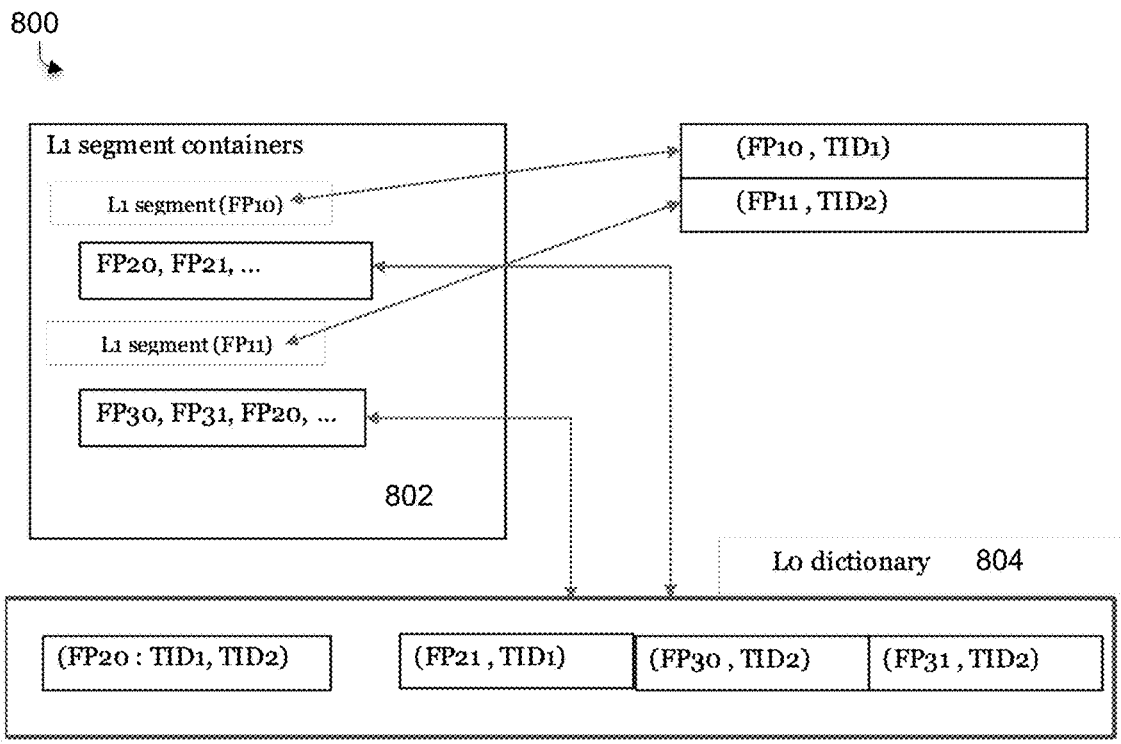
FIG. 8 illustrates a fingerprint-tag mapping for an L0 dictionary in an example embodiment.

In the last iteration of process 600, all the L1 containers are read sequentially, if the L1 segment is in the dictionary, all the L0 references and the corresponding file ID are inserted into an L0 dictionary. At this point, L0 segments can be shared by multiple L1 segments. Each record in the L0 dictionary can hold multiple tag ID's and each new tag ID not in the record yet will be added. An example of this is shown in diagram 800 of FIG. 8 in which L1 segment containers 802 contain fingerprints for L1 segment (FP10) and (FP11), and the L0 dictionary 804 holds the denoted fingerprint-tag pairs for FP20, FP21, FP30, and FP31.

L0 Fingerprint Dictionary

As stated above, in addition to the LP fingerprint dictionary, the MUFS process uses an L0 fingerprint dictionary, that is similar to the LP dictionary. This L0 fingerprint dictionary provides a mapping between L0 fingerprints and the tag ID's that have a reference to the segment. It can be implemented using a basic hash table or any dictionary data structures. The key differences between the LP and the L0 dictionary are: (1) there can be multiple references to the same FP. The record must be able to hold many tags, and (2) a dynamic memory allocator is used to supply the variable size tag buffers. The term "dynamic" means that memory is appropriately allocated on demand through both increase and decrease of buffer sizes. Thus, in addition to a dynamic on-demand allocation the process can dynamically shrink the buffer size of the large sized allocations, to make room for smaller allocations.

In an embodiment, a dynamic buffer resizing process for use with a slab memory allocator may be used, such as that described in the above cross-referenced co-pending patent application, which is herein incorporated by reference in its entirety. Embodiments are not so limited, however, and other similar buffer allocation or resizing methods may also be used.

Some L0 segments can be referenced by many tags. It is workload dependent and there is no proper upper bound. The memory allocator should be able to supply large tag buffers if needed. If only a few L0's have high tag references, not too much memory will be consumed. However, if there are many such L0's, memory can be exhausted before new L0's can be added to the dictionary. The solution is to dynamically resize the tag buffers and drop some tags to free up memory for the smaller tag buffers. It can be shown that this action has no effect on the unique size estimation.

FIGS. 9 and 10 provide an example demonstration of why such a dynamic memory allocator is needed. For these figures, it is assumed that the total number of tags the memory can hold is 50. FIG. 9 illustrates an example case where the tag limit is set to a very low limit (e.g., tag limit=5). As can be seen in this example, for FP set 902 in the L0 dictionary, three tags for FP1 are evicted, two tags for FP3 are evicted and four tags for FP4 are evicted, resulting in nine tags being evicted unnecessarily. FIG. 10 illustrates an example case where the tag limit is set to a very high limit (e.g., tag limit=30). In this case, for FP set 1002 in the L0 dictionary, memory can be exhausted after the third FP (FP3), and no memory is available for FP4 and FP5 and anything after that. Thus, setting a tag limit too low results in unnecessary tag eviction, and setting it too high results in unavailable memory.

In an embodiment, the MUFS process includes a method to dynamically reclaim portion of the larger memory buffers to make room for the smaller allocation. Initially a large limit is set, and it is dynamically reduced once all the available memory is exhausted. The allocator will inform the consumer that the memory buffer must be shrunk to a smaller size, e.g. half the size and the consumer must drop some of its content. This allows the memory allocator to adapt to the workload.

In an embodiment, a dynamic memory allocator supports allocation of very large tag buffers. If the memory is exhausted, there is a reclaim interface that allows the memory allocator to shrink the largest memory buffers to make room for the new allocations. Some of the tags in those large buffers will have to be dropped in a random manner. In addition to the dictionary structure, an axillary segment count array SC[0: N] is used to record the total number of sampled segments in the dictionary for each tag. Based on the fourth assumption mentioned above, this is a densely packed array of size N where N is the number of tags.

Figure 11:
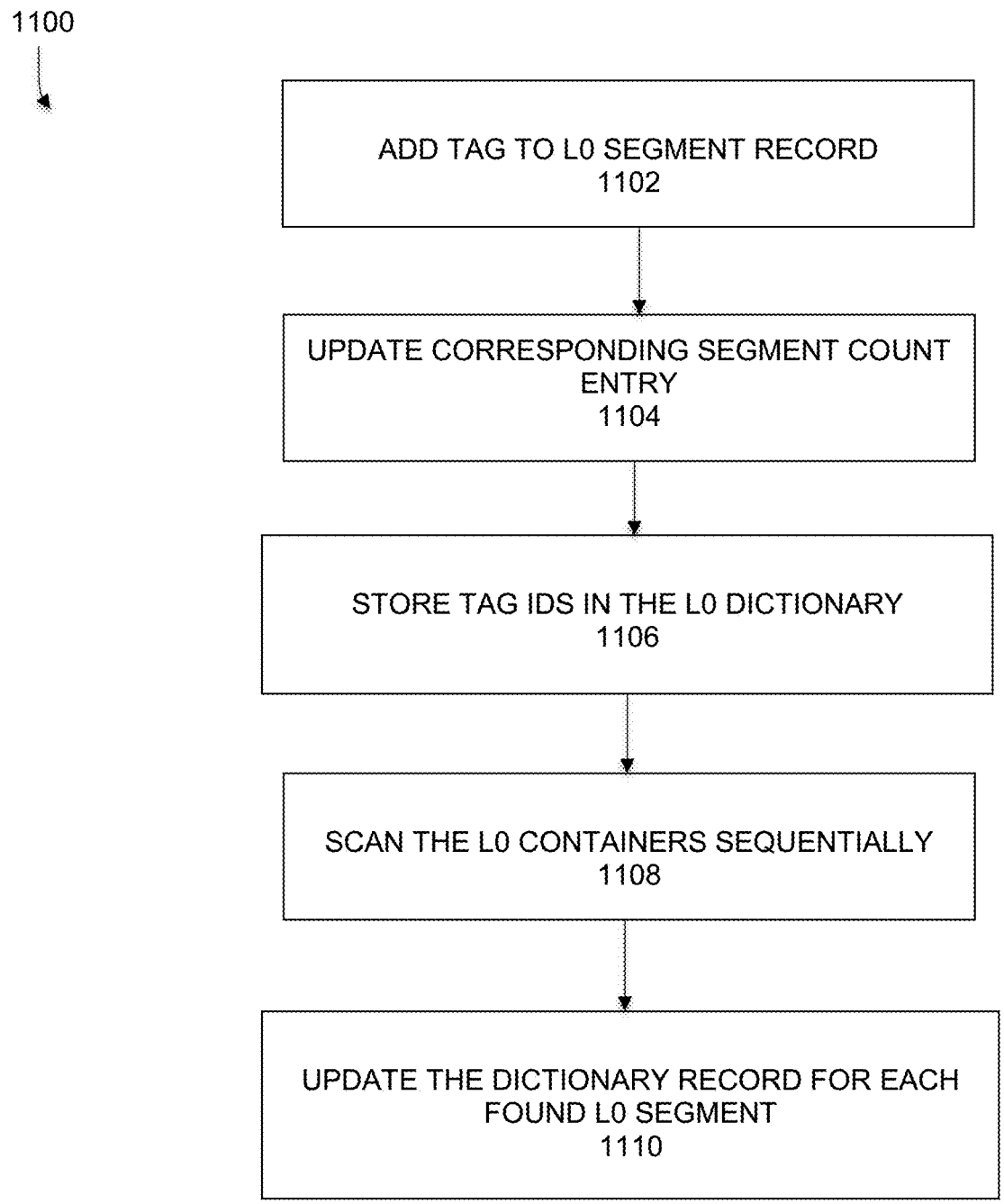
FIG. 11 is a flowchart that illustrates a method of constructing an L0 fingerprint dictionary, under some embodiments.
Figure 12:
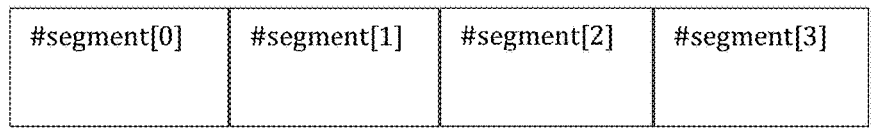
FIG. 12 illustrates an axillary segment count array used by the MUFS, under some embodiments.

FIG. 11 is a flowchart that illustrates a method of constructing an L0 fingerprint dictionary, under some embodiments. Process 1100 of FIG. 11 starts with adding a tag to the L0 segment record, 1102. Every time a tag is added to a L0 segment record, the corresponding segment count entry will be updated, 1104. FIG. 12 illustrates an axillary segment count array used by the MUFS, under some embodiments. As shown in FIG. 12, data element 1200 includes four segments denoted #segment[0], #segment[1], #segment[2], and #segment[3]. This information is needed to compensate the bias caused by memory reclamation.

Figure 13:
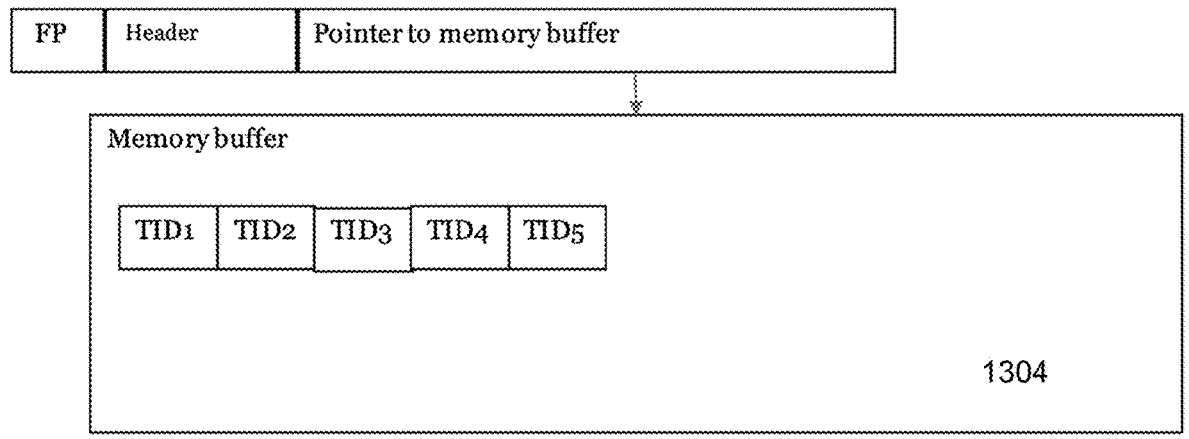
FIG. 13 illustrates an L0 dictionary record for the MUFS process, under some embodiments.

In step 1106, the tag IDs are stored in the L0 dictionary, 1106. The u-index, the total unique size and total size of a tag can be computed very efficiently using the L0 dictionary. FIG. 13 illustrates an L0 dictionary record for the MUFS process, under some embodiments. The L0 dictionary record 1302 contains the key (FP), some internal state information and a pointer to the tag buffer in memory 1304. This buffer stores the tag IDs, denoted TID1 to TID5 for the example of FIG. 13. Initially the smallest tag buffer will be allocated, and larger ones will replace the small ones as more tags are inserted into the record. The header/state contains the number of TID's, the uncompressed segment size and the compressed segment size. The sizing information is not available in the LP tree walk. It is obtained in the next step. After all the L0 references have been inserted into the L0 dictionary, the L0 containers are scanned sequentially to determine the size of each segment, 1108. For each L0 segment found in the container, if it is also found in the L0 dictionary, the segment's uncompressed size and the compressed size are updated in the dictionary record, 1110.

During memory reclamation, tags are dropped from the record. However, it has little effect on the statistics that are to be computed. These include the total unique size and the total size. With respect to the total unique size, since the segment is shared by many other tags, it is not unique for the tag and it will not be used in the total unique size estimation. Therefore, there is no impact to the total unique size estimation of the tag. For the total size, because tags can be dropped, the total sampled segment size for a tag can have a negative bias. This is the reason for creating the axillary total sampled segment count array 1200.

The entries in the L0 dictionary are used to estimate the average segment size for the tag and then the total size is computed using the formula:

Total Size=(Average Segment Size)*(Total Segment Count)

This will produce an unbiased estimate of the total sampled segment size, which can be used to estimate the total size of the tag. Since the u-index is just the ratio of the total unique size and the total size, which can both be estimated correctly, they will produce an unbiased estimate of the u-index.

To compute the total unique size of the tags, define UC[0:N], UU[0:N] to be the unique compressed and uncompressed size. The process iterates the L0 dictionary, if T is the only tag referencing the dictionary, add the compressed size of the segment to UC[T] and add the uncompressed size of the segment to UU[T]. At the end of the iteration, UC and UU will contain the compressed and uncompressed unique size of all the tags.

To compute the total size of the tags, define TC[0:N], TU[0:N] to be the total compressed and uncompressed size. Define NT[0:N] and to be the total number of sampled segments. Iterate the L0 dictionary, if a tag T is referencing the segment, add the compressed size of the segment to TC[T] and add the uncompressed size of the segment to TU[T] and increment NT [T]. The average segment size of each tag T is therefore TC[T]/NT [T] and TU[T]/NT[T]. The total sample compressed size of the tag T is therefore TC[T]/NT[T] *SC[T] where SC is the total segment count of T. The total sampled uncompressed size of the tag T is TU[T]/NT[T] *SC[T]. If there has not been any eviction on the tag, SC[T] should be equal to NT.

The u-index (U) can then be computed using the following formula:

$U$=(total unique size of the tag $T$)/(total size of the tag)=$UC[T]/TC[T]$

Once the u-indices has been computed, the tags will be selected based on the u-index. Tags with higher u-index will be selected first until the total unique size has reached the desired amount. In extreme cases, for example, tags exist in pairs. In this case there is an identical tag for every tag. The u-index for all these tags will be 0 and the process may not be able to free any space. However, MUFS process described herein should be able to free space in most cases. To ensure some degree of effectiveness, a minimum u-index should be defined and only tags with u-index greater than this minimum u-index should be selected. If not enough space can be freed, similar tags have to be grouped together to form a union with a larger u-index. A hierarchical clustering algorithm, for example, can be used for this purpose.

Figure 14:
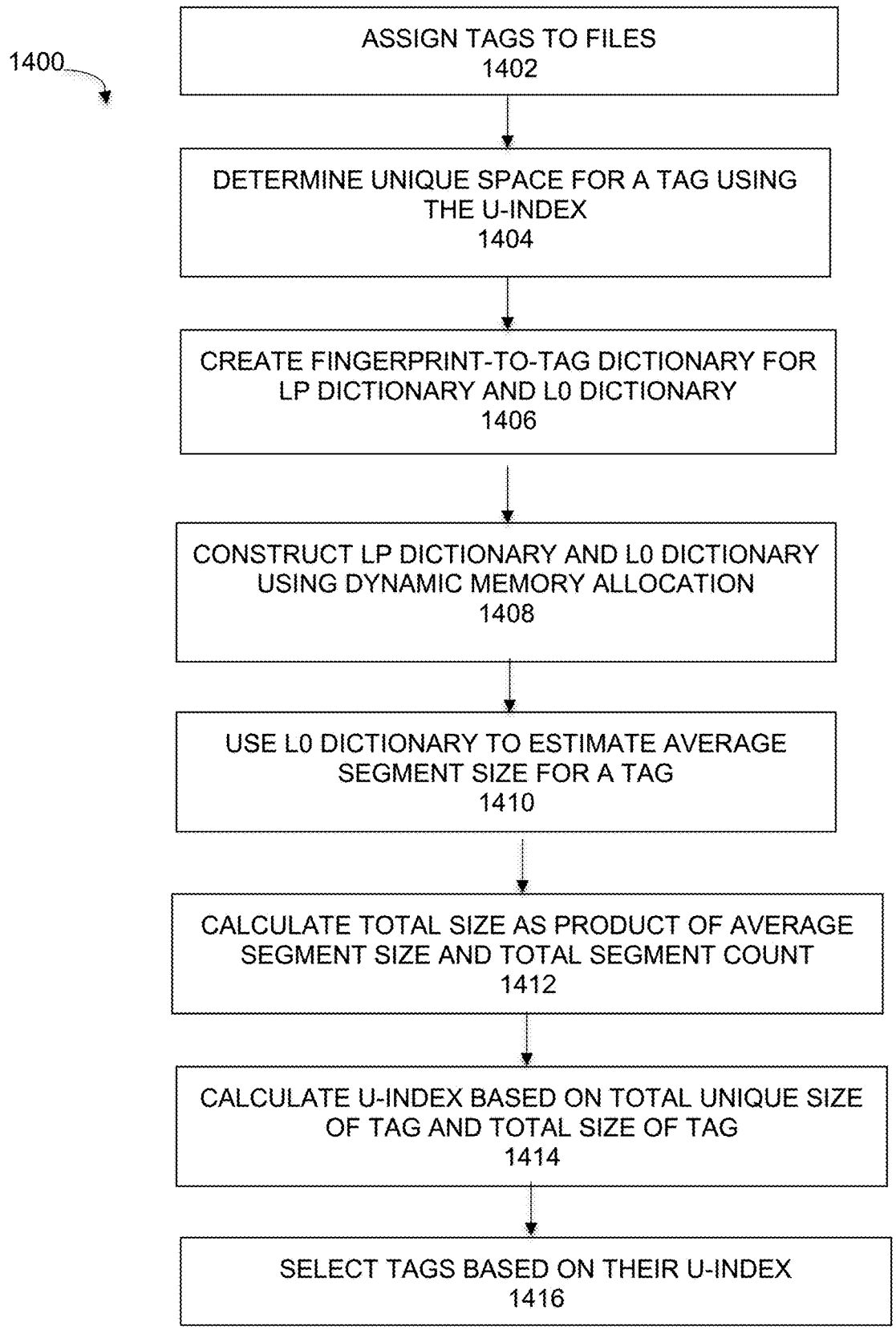
FIG. 14 is a flowchart that illustrates an overall method of the MUFS process, under some embodiments.

FIG. 14 is a flowchart that illustrates an overall method of the MUFS process, under some embodiments. Process 1400 begins in step 1402 with assigning tags to files, such as may be done in the DDFS system through 64-byte integer, or similar. The tag serves as a hint about the similarity of files in a deduplication file system. It is expected that files from the same client machine will be assigned the same tag. The tag is the smallest unit of migration and serves as a hint of the similarity of the files. Files with the same tag will be placed in the same node by DDFS. Although tags contain similar files with itself, there can also be deduplication among tags. If there is a log of duplication between two tags and only one of them is moved, not much space will be freed up on the source node.

The process then determines the unique space for a tag using the u-index, 1404. It creates a fingerprint-to-tag dictionary for use in an LP dictionary and L0 dictionary, 1406. The process then constructs the LP dictionary and L0 dictionary using dynamic memory allocation to prevent memory exhaustion and reduce unnecessary tag eviction, 1408. The L0 dictionary is then used to estimate an average segment size for a tag, 1410. The total size is calculated as the product of the average segment size and the total segment count, 1412. The u-index is then calculated based on the total unique size of the tag and the total size of the tag, 1414. Overall, the MUFS process measures the uniqueness of each tag and a load balancer can then select the most unique tags for migration to free the maximum space, 1416. It uses the u-index to measure the uniqueness percentage of a tag, so that tags with the highest u-index are selected for migration to free up maximum space on the source node.

System Implementation

Embodiments of the processes and techniques described above can be implemented on any appropriate backup system operating environment or file system, or network server system. Such embodiments may include other or alternative data structures or definitions as needed or appropriate.

Figure 15:
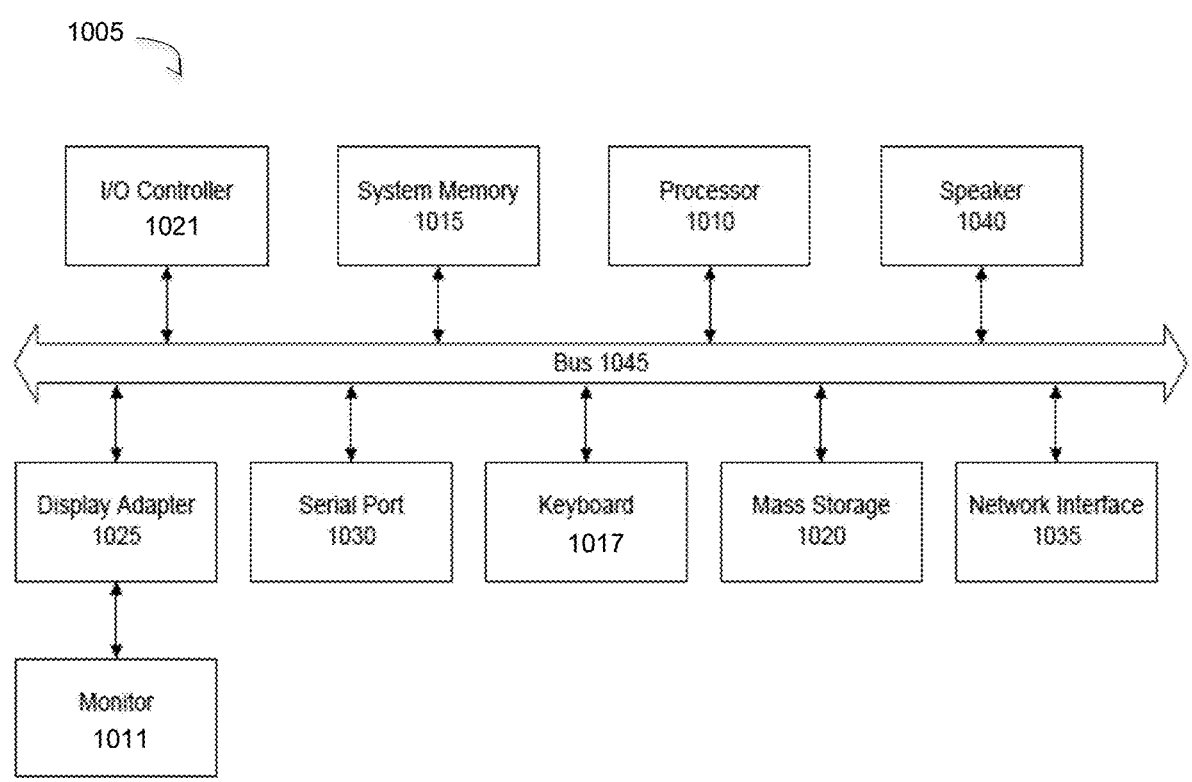
FIG. 15 is a system block diagram of a computer system used to execute one or more software components of the MUFS process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 15 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 12 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for moving files among nodes in a clustered network having a deduplication file system, comprising:

assigning a tag to each file in the deduplication file system, wherein a tag provides a hint of similarity between files, and wherein each file comprises data segments stored in a LP segment tree for a namespace of the file system and having a strict hierarchy of L6 above L5 above L4 above L3 above L2 above L1 above L0, wherein LP levels LP6 to LP1 store metadata and L0 stores data of the data segments in fixed size containers, and wherein each level contains fingerprint references to lower levels to map a super segment comprising a content handle for the file to the corresponding data in L0;

calculating a percentage of uniqueness of each tag expressed as a uniqueness index (u-index) calculated by dividing a total unique space for the tag by the total physical space for the tag; and selecting, by a load balancer component of the system, tags with a highest u-index to be moved from a source node to a target node until a desired total unique size has been reached, so as to provide efficient load balancing in the deduplication file system executed by a deduplication backup server computer;

defining an LP dictionary mapping one fingerprint to one tag for all of the fingerprints in the LP segment tree, wherein the fingerprint is stored as a key and the tag is stored as a corresponding value for storage as a key-value pair mapping the fingerprint (FP) to a tag identifier (TID);

defining an L0 dictionary mapping L0 fingerprints and tag identifiers that have a reference to a corresponding segment, by reading the L1 segments sequentially, wherein the L1 level references the L0 level, and inserting into the L0 dictionary all L0 references and corresponding tag identifiers, wherein each record in the L0 dictionary can hold multiple tag identifiers;

defining an axillary segment count array to record a total number of sampled segments in the L0 dictionary for each tag identifier;

updating a corresponding segment count entry in the array each time a tag is added to an L0 segment record, wherein each L0 dictionary record contains a fingerprint as a key and a pointer to a corresponding tag buffer;

scanning L0 containers sequentially to determine a size of each data segment;

updating, for each found L0 segment that is in the L0 dictionary, an uncompressed size and compressed size of the found L0 segment in the corresponding L0 dictionary record; and calculating a total unique size of the tags for the total unique space for the tag by iterating the L0 dictionary to find tag identifiers referencing specific fingerprints, adding, if a tag is exclusively referencing a specific fingerprint, a compressed size of the segment to a compressed array and adding an uncompressed size of the segment to an uncompressed array, and calculating, after a final iteration of the iterating step, the compressed and uncompressed unique sizes of all tags using the compressed array and uncompressed array.

2. The method of claim 1 further comprising constructing the LP dictionary by:

scanning the namespace to find tags for all the L6 segments;

inserting into the LP dictionary all the L6 segments for the found tags; and scanning the containers sequentially from L6 to L1 to insert all fingerprints contained in an Ln segment into the LP dictionary, where n=6, 5, 4, 3, 2, 1.

3. The method of claim 1 further comprising providing a dynamic memory allocator for the L0 dictionary to supply variable size tag buffers allowing a size of a buffer to be reduced on demand for efficient buffer memory allocation.

4. The method of claim 1 further comprising:

creating an axillary total sampled segment count array;

estimating, using the L0 dictionary, an average segment size for a corresponding tag identifier; and calculating a total size value by multiplying the average segment size by a total segment count to eliminate or reduce any effect of memory reclamation resulting in tags dropped from the L0 dictionary records.

5. The method of claim 1 further comprising calculating the total size of the tags by:

defining a TC array to be the total compressed size;

defining a TU array to be the total uncompressed size;

defining an NT array to be the total number of sampled segments;

adding, for each iteration of the iterating step, the compressed size of the segment to the TC array, the uncompressed size of the segment to the TU array, and incrementing the NT array;

calculating the total sample compressed size of the tag by dividing the TC array by the NT array multiplied by a total segment count; and calculating the total sample uncompressed size of the tag by dividing the TU array by the NT array multiplied by the total segment count.

6. The method of claim 5 wherein the u-index is calculated by dividing the total unique size of the tag by the total size of the tag.

7. The method of claim 1 wherein the total unique space for a tag is a value between 0 and 1 wherein a value of 0 indicates that a tag is entirely identical to another tag and a value of 1 indicates that the tag is entirely unique to itself.

8. A computer-implemented method for moving files among nodes in a clustered network having a deduplication file system, comprising:

assigning a tag to each file in the deduplication file system, wherein a tag provides a hint of similarity between files, and wherein a file comprises data segments stored in L0 of a segment tree and metadata stored in LP levels of the segment tree, and each segment is identified by a fingerprint;

providing a fingerprint-to-tag dictionary mapping a fingerprint to a corresponding tag identifier (TagID) as a key-value pair;

providing an LP dictionary mapping one fingerprint to one tag using the fingerprint-to-tag dictionary;

providing an L0 dictionary mapping L0 fingerprints and tag identifiers that reference a specific data segment;

computing a total unique size of the tags by: iterating the L0 dictionary to find tag identifiers referencing specific fingerprints, adding, if a tag is exclusively referencing a specific fingerprint, a compressed size of the segment to a compressed array and adding an uncompressed size of the segment to an uncompressed array, and calculating, after a final iteration of the iterating step, the compressed and uncompressed unique sizes of all tags using the compressed array and uncompressed array;

computing the total size of the tags;

computing a uniqueness index (u-index) for the tag by dividing the total unique size of the tag by the total size of the tag; and selecting, by a load balancer component of the system, tags with a highest u-index to be moved from a source node to a target node until a desired total unique size has been reached.

9. The method of claim 8 further comprising:

defining an axillary segment count array to record a total number of sampled segments in the L0 dictionary for tag; and using an average segment size for the tag to calculate the total size of the tag to minimize any effects of memory reclamation from dropping tags from a record.

10. The method of claim 9 further comprising dynamically allocating memory for the L0 dictionary to supply variable size tag buffers allowing a size of a buffer to be reduced on demand for efficient buffer memory allocation.

11. The method of claim 10 wherein:

the LP dictionary is constructed by scanning a namespace of the segment tree, inserting all L6 segments corresponding to found tags in the LP dictionary, scanning containers storing the data segments sequentially from L6 to L1 to insert all fingerprints contained in an Ln segment into the LP dictionary, where n=6, 5, 4, 3, 2, 1; and the L0 dictionary is constructed by reading the L1 segments sequentially, wherein the L1 level references the L0 level; and inserting, into the L0 dictionary, all L0 references and corresponding tag identifiers.

12. The method of claim 8 wherein the total unique space for a tag is a value between 0 and 1 wherein a value of 0 indicates that a tag is entirely identical to another tag and a value of 1 indicates that the tag is entirely unique to itself.

13. A system for moving files among nodes in a clustered network having a deduplication file system, comprising:

a first processing unit assigning a tag to each file in the deduplication file system, wherein a tag provides a hint of similarity between files;

a second processing unit: calculating a percentage of uniqueness of each tag expressed as a uniqueness index (u-index) calculated by dividing a total unique space for the tag by the total physical space for the tag; assigning a tag to each file in the deduplication file system, wherein a tag provides a hint of similarity between files, and wherein a file comprises data segments stored in L0 of a segment tree and metadata stored in LP levels of the segment tree, and each segment is identified by a fingerprint; providing a fingerprint-to-tag dictionary mapping a fingerprint to a corresponding tag identifier (TagID) as a key-value pair; providing an LP dictionary mapping one fingerprint to one tag using the fingerprint-to-tag dictionary, providing an L0 dictionary mapping L0 fingerprints and tag identifiers that reference a specific data segment; computing a total unique size of the tags by: iterating the L0 dictionary to find tag identifiers referencing specific fingerprints, adding, if a tag is exclusively referencing a specific fingerprint, a compressed size of the segment to a compressed array and adding an uncompressed size of the segment to an uncompressed array, and calculating, after a final iteration of the iterating step, the compressed and uncompressed unique sizes of all tags using the compressed array and uncompressed array; and a load balancer selecting tags with a highest u-index to be moved from a source node to a target node until a desired total unique size has been reached, so as to provide efficient load balancing in the deduplication file system executed by a deduplication backup server computer.

\* \* \* \* \*